US006355074B1

(12) United States Patent
Emert et al.

(10) Patent No.: US 6,355,074 B1
(45) Date of Patent: Mar. 12, 2002

(54) OIL SOLUBLE DISPERSANT ADDITIVES USEFUL IN OLEAGINOUS COMPOSITIONS

(75) Inventors: Jacob Emert, Brooklyn, NY (US); Robert D. Lundberg, Bridgewater; Malcolm Waddoups, Westfield, both of NJ (US)

(73) Assignee: Exxon Chemical Patents INC

( * ) Notice: Subject to any disclaimer, the term of this patent is extended or adjusted under 35 U.S.C. 154(b) by 0 days.

(21) Appl. No.: 08/450,506

(22) Filed: May 25, 1995

Related U.S. Application Data

(62) Division of application No. 07/755,603, filed on Sep. 5, 1991, now Pat. No. 6,127,321, which is a continuation of application No. 07/613,330, filed on Nov. 8, 1990, now abandoned, which is a continuation of application No. 07/488,320, filed on Mar. 5, 1990, now abandoned, which is a continuation of application No. 07/235,920, filed on Aug. 23, 1988, now abandoned, which is a continuation of application No. 07/032,066, filed on Mar. 27, 1987, now abandoned, which is a continuation of application No. 06/754,001, filed on Jul. 11, 1985, now abandoned.

(51) Int. Cl.$^7$ .............................. C10L 1/18; C10L 1/22; C10L 1/30

(52) U.S. Cl. .............................. 44/317; 44/330; 44/331; 44/347; 44/351

(58) Field of Search .......................... 44/314, 316, 317, 44/331, 330, 347, 400, 351, 386, 389; 252/51.5 A, 56 D, 496

(56) References Cited

U.S. PATENT DOCUMENTS

| | | | |
|---|---|---|---|
| 2,744,069 A | 5/1956 | van Loon | 252/40.7 |
| 3,087,436 A | 4/1963 | Dettlof et al. | 103/130 |
| 3,087,936 A | 4/1963 | LeSuer | 260/326.3 |
| 3,131,150 A | 4/1964 | Stuart et al. | 252/34.7 |
| 3,150,088 A | 9/1964 | Hunt et al. | 252/32.7 |
| 3,150,089 A | 9/1964 | Hunt | 252/33 |
| 3,154,560 A | 10/1964 | Osuch | 260/326.3 |
| 3,172,892 A | 3/1965 | LeSuer et al. | 260/326.3 |
| 3,184,474 A | 5/1965 | Catto et al. | 260/326.3 |
| 3,198,736 A | 8/1965 | Henderson | 252/46.7 |
| 3,215,707 A | 11/1965 | Rense et al. | 260/326.3 |
| 3,219,666 A | 11/1965 | Norman et al. | 260/268 |
| 3,231,587 A | 1/1966 | Rense | 260/346.8 |
| 3,235,484 A | 2/1966 | Colfer | 208/48 |
| 3,254,025 A | 5/1966 | LeSuer | 252/32.7 |
| 3,269,946 A | 8/1966 | Wiese | 252/32.5 |
| 3,272,743 A | 9/1966 | Norman et al. | 252/32.5 |
| 3,272,746 A | 9/1966 | LeSuer et al. | 252/47.5 |
| 3,278,550 A | 10/1966 | Norman et al. | 260/326.3 |
| 3,284,409 A | 11/1966 | Dorer | 252/49.9 |
| 3,284,410 A | 11/1966 | Meinhardt | 252/49.6 |
| 3,288,714 A | 11/1966 | Osuch | 252/57 |
| RE26,330 E | 1/1968 | Colfer | 208/48 |
| 3,361,673 A | 1/1968 | Stuart et al. | 252/51.5 |
| 3,401,118 A | 9/1968 | Benoit | 252/51.5 |
| 3,403,102 A | 9/1968 | LeSuer | 252/49.8 |
| 3,445,386 A | 5/1969 | Otto et al. | 252/32.7 |
| 3,522,179 A | 7/1970 | LeSuer | 252/51.5 |
| 3,562,159 A | 2/1971 | Mastin | 252/32.7 |
| 3,576,743 A | 4/1971 | Widmer et al. | 252/51.5 |
| 3,595,791 A | 7/1971 | Cohen | 252/33.6 |
| 3,632,510 A | 1/1972 | LeSuer | 252/35 |
| 3,632,511 A | 1/1972 | Liao | 252/51.5 A |
| 3,704,315 A | 11/1972 | Strang | 260/521 R |
| 3,714,042 A | 1/1973 | Greenough | 252/33.2 |
| 3,804,763 A | 4/1974 | Meinhardt | 252/51.5 A |
| 3,836,470 A | 9/1974 | Miller | 252/51.5 A |
| 3,836,471 A | 9/1974 | Miller | 252/51.5 A |
| 3,838,050 A | 9/1974 | Miller | 252/40.5 |
| 3,838,052 A | 9/1974 | Miller | 252/56 R |
| 3,879,308 A | 4/1975 | Miller | 252/56 R |
| 3,912,764 A | 10/1975 | Palmer, Jr. | 260/346.8 |
| 3,927,041 A | 12/1975 | Cengel et al. | 260/346.8 |
| 3,936,480 A | 2/1976 | Demoures et al. | 260/404.5 |
| 3,950,341 A | 4/1976 | Okamoto et al. | 260/268 G |
| 3,960,889 A | 6/1976 | Cullen et al. | 260/326.5 |
| 3,965,017 A | 6/1976 | Burnop et al. | 252/33.2 |
| 3,991,056 A | 11/1976 | Okamoto et al. | 260/268 C |
| 3,991,098 A | 11/1976 | Okamoto | 260/482 R |
| 4,011,167 A | 3/1977 | Chibnik et al. | 252/42.7 |
| 4,039,300 A | 8/1977 | Chloupek et al. | 44/58 |
| 4,062,786 A | 12/1977 | Brois et al. | 252/51.5 |
| 4,102,798 A | 7/1978 | Ryer et al. | 252/51.5 |
| 4,110,349 A | 8/1978 | Cohen | 260/346.74 |
| 4,113,639 A | 9/1978 | Lonstrup et al. | 252/51.5 |
| 4,116,876 A | 9/1978 | Brois et al. | 252/49.6 |
| 4,119,553 A | 10/1978 | Cane et al. | 560/198 |
| 4,123,373 A | 10/1978 | Brois et al. | 252/48.6 |

(List continued on next page.)

FOREIGN PATENT DOCUMENTS

| | | |
|---|---|---|
| CA | 895 398 | 3/1972 |
| GB | 960 493 | 10/1964 |
| GB | 984 409 | 2/1965 |
| GB | 1 368 277 | 9/1974 |
| GB | 1 398 008 | 6/1975 |
| GB | 1 440 219 | 6/1976 |
| GB | 2 061 958 | 5/1981 |
| GB | 2 062 672 | 5/1983 |

OTHER PUBLICATIONS

E.S. Forbes, et al., "Mechanism of Action of Polyisobutenyl Succinimides Lurbrciating Oil Additives", Tribology vol. 5, No. 2, 72–77 (1972). month unknown.

*Primary Examiner*—Margaret Medley

(57) ABSTRACT

Hydrocarbyl substituted $C_4$ to $C_{10}$ monounsaturated dicarboxylic acid, anhydrides or esters, e.g. polyisobutenyl succinic anhydride, preferably made by reacting polymer of $C_2$ to $C_{10}$ monoolefin, preferably polyisobutylene, having a molecular weight of about 1500 to 5,000, preferably with a $C_4$ to $C_{10}$ monounsaturated acid, anhydride or ester, preferably maleic anhydride, such that there are 1.05 to 1.25 dicarboxylic acid producing moieties per molecule of said olefin polymer used in the reaction mixture. The resulting materials are useful per se as oil additives, or may be further reacted with amines, alcohols, amino alcohols, boric acid, etc. to form dispersants.

19 Claims, No Drawings

U.S. PATENT DOCUMENTS

| | | | |
|---|---|---|---|
| 4,151,173 A | 4/1979 | Vogel | 260/326.5 F |
| 4,195,976 A | 4/1980 | Ryer et al. | 44/63 |
| 4,234,435 A | 11/1980 | Meinhardt et al. | 252/51.5 A |
| 4,502,970 A | 3/1985 | Schetelich et al. | 252/32.7 |
| 4,502,971 A | 3/1985 | Robson | 252/33.3 |
| 4,686,054 A | 8/1987 | Wisotsky et al. | 252/32.7 |

OIL SOLUBLE DISPERSANT ADDITIVES USEFUL IN OLEAGINOUS COMPOSITIONS

This is a division of U.S. Ser. No. 07/755,603, filed Sep. 5, 1991, now U.S. Pat. No. 6,127,321; which is a continuation of U.S. Ser. No. 07/613,330, filed Nov. 8, 1990, abandoned; which is a continuation of U.S. Ser. No. 07/488,320, filed Mar. 5, 1990, abandoned; which is a continuation of U.S. Ser. No. 07/235,920, filed Aug. 23, 1988, abandoned; which is a continuation of U.S. Ser. No. 07/032,066, filed Mar. 27, 1987, abandoned; which is a continuation of U.S. Ser. No. 06/754,001, filed Jul. 11, 1985, abandoned.

BACKGROUND OF THE INVENTION

1. Field of the Invention

This invention relates to oil soluble dispersant additives useful in fuel and lubricating oil compositions, including concentrates containing said additives, and methods for their manufacture and use. The dispersant additives are dicarboxylic acids, anhydrides, esters, etc., substituted with a high molecular weight hydrocarbon group, and derivatives thereof such as salts, amides, imides, esters, oxazolines, etc. formed by further reaction with amine, alcohol, amino alcohols, and which may be further treated, e.g. borated. The high molecular weight hydrocarbon group has a number average molecular weight ($\overline{M}_n$) of about 1500 to 5000. The additives will have a ratio (functionality) of about 1.05 to 1.25 dicarboxylic acid producing moieties per said high molecular weight hydrocarbon used in the reaction.

2. Prior Disclosures

U.S. 4,234,435 discloses as oil additives, polyalkene substituted dicarboxylic acids derived from polyalkenes having a $\overline{M}_n$ of 1300 to 5,000 and containing at least 1.3 dicarboxylic acid groups per polyalkene.

Canadian Patent 895,398 discloses reacting a mole of an unsaturated hydrocarbon group of 700 to 10,000 mol. wt. with 1 to 1.5 moles of chloro-substituted maleic or fumaric acid, which material can then be further reacted with alcohol.

U.S. Pat. No. 3,927,041 discloses a mole of polybutene of 300 to 3,000 mol. wt. containing 5 to 200 ppm 1,3 dibromo-5.5-dialkylhydantoin as a catalyst reacted with 0.8 to 5, generally 1.05 to 1.15 moles of dicarboxylic acid or anhydride, to form materials which can be used per se, or as esters, amides, imides, amidines, in petroleum products.

U.S. Pat. No. 3,215,707 discloses reacting chlorine with a mixture of polyolefin up to 50,000 molecular weight, especially of 250 to 3,000 molecular weight with one or more moles of maleic anhydride depending upon whether one or more succinic anhydride radicals are to be in each polymer molecule.

U.S. Pat. Nos. 4,113,639 and 4,116,876 disclose an example of alkenyl succinic anhydride having a molecular weight of the alkenyl group of 1300 and a Saponification Number of 103 (about 1.3 succinic anhydride units per hydrocarbon molecule. This alkenyl succinic anhydride may be reacted with polyamine and then boric acid (U.S. 4,113,639), or may be reacted with an amino alcohol to form an oxazoline (4,116,876) which is then borated by reaction with boric acid.

U.S. Pat. No. 4,062,786 in Example 13 shows a polyisobutenylsuccinic anhydride of molecular weight of about 1300 and a Saponification Number of about 100 (about 1.25 succinic anhydride units per alkenyl group).

U.S. Pat. No. 4,123,373 in Example 3 shows a polyisobutenylsuccinic anhydride of about 1400 molecular weight having a Saponification Number of 80 (about 1.07 succinic anhydride units per polyisobutylene units.

Further related prior disclosures, which are expressly incorporated herein by reference in their entirety are U.S. Pat. Nos.: 3,087,936; 3,131,150; 3,154,560; 3,172,892; 3,198,736; 3,219,666; 3,231,587; 3,235,484; 3,269,946; 3,272,743; 3,272,746; 3,278,550; 3,284,409; 3,284,410; 3,288,714; 3,403,102; 3,562,159; 3,576,743; 3,632,510; 3,836,470; 3,836,471; 3,838,050; 3,838,052; 3,879,308; 3,912,764; 3,927,041; Re. 26,330; 4,110,349; 4,113,639; 4,151,173; 4,195,976; and U.K. Patents 1,368,277 and 1,398,008.

SUMMARY OF THE INVENTION

The present invention is directed to a dispersant additive comprising a polyolefin of 1500 to 5,000 number average molecular weight substituted with 1.05 to 1.25, preferably 1.06 to 1.20, e.g. 1.10 to 1.20 dicarboxylic acid producing moieties, preferably acid or anhydride moieties, per polyolefin molecule. This acid or anhydride material is useful per se as an additive, e.g. a dispersant additive, for example in the same manner as previously known polyolefin substituted dicarboxylic acid or anhydride acylating agents as disclosed in U.S. Pat. No. 3,288,714 where prior acylating agents are used as dispersant/detergents and U.S. Pat. No. 3,714,042 where prior acylating agents are used to treat overbased metal complexes. Also, the material of the invention can be used in the manner described in U.S. Pat. No. 3,965,017 wherein overbased detergents are treated with acylating agents. The dicarboxylic acid producing materials of the invention can also be further reacted with amines, alcohols, including polyols, amino-alcohols, etc. to form other useful dispersant additives. Thus, if the acid producing material is to be further reacted, e.g. neutralized, then generally a major proportion of at least 50% of the acid units up to all the acid units will be reacted.

The materials of the invention are different from the prior art because of their effectiveness coupled with their low degree of interaction with other additives, as compared to those prior disclosures mentioned above which have a functionality of 1.3 or more dicarboxylic acid producing groups per hydrocarbon moiety used in the reaction.

Lubricating oil compositions, e.g. automatic transmission fluids, heavy duty oils suitable for gasoline and diesel engines, etc., can be prepared with the additives of the invention. Universal type crankcase oils wherein the same lubricating oil compositions can be used for both gasoline and diesel engine can also be prepared. These lubricating oil formulations conventionally contain several different types of additives that will supply the characteristics that are required in the formulations. Among these types of additives are included viscosity index improvers, antioxidants, corrosion inhibitors, detergents, dispersants, pour point depressants, antiwear agents, etc.

In the preparation of lubricating oil formulations it is common practice to introduce the additives in the form of 10 to 80 wt. %, e.g. 20 to 80 wt. % active ingredient concentrates in hydrocarbon oil, e.g. mineral lubricating oil, or other suitable solvent. Usually these concentrates may be diluted with 3 to 40, e.g. 5 to 20 parts by weight of lubricating oil, per part by weight of the additive package, in forming finished lubricants, e.g. crankcase motor oils. The purpose of concentrates, is of course, to make the handling of the various materials less difficult and awkward as well as to facilitate solution or dispersion in the final blend. Thus, a metal hydrocarbyl sulfonate or a metal alkyl phenate would be usually employed in the form of a 40 to 50 wt. % concentrate, for example, in a lubricating oil fraction. Ordinarily when preparing a lubricating oil blend that contains several types of additives no problems arise where each additive is incorporated separately in the form of a concentrate in oil. In many instances, however, the additive supplier will want to make available an additive "package" comprising a number of additives in a single concentrate in a hydrocarbon oil or other suitable solvent. Some additives tend to react with each other in an oil concentrate. Dispersants having a functionality (ratio) of 1.3 or higher, of the dicarboxylic acid moieties per hydrocarbon molecule have been found to interact with various other additives in packages, particularly overbased metal detergents to cause a viscosity increase upon blending, which may be followed by a subsequent growth or increase of viscosity with time in some instances resulting in gellation of the blend. This viscosity increase can hamper pumping, blending and handling of the concentrate. While the package can be further diluted with more diluent oil to reduce the viscosity to offset the interaction effect, this dilution reduces the economy of using the package by increasing shipping, storage and other handling costs. The materials of the present invention with a functionality below 1.25:1 minimize this viscosity interaction while achieving an effective additive. The composition described represents an additional improvement in that the hydrocarbon polymer required to maintain the oil solubility of the dispersant during engine operation can be provided with fewer acylating units per polyamine. For example, a typical dispersant derived from a polybutene acylating agent with a functionality of 1.3 or more dicarboxylic acid groups per polymer, condensed with a polyethyleneamine containing 4–7 nitrogen atoms per molecule, would require two or more acylating units per polyamine to provide sufficient oil solubility for adequate dispersancy in gasoline and diesel engines. Reducing the functionality below 1.25 generates the requisite ratio of oil-soluble polymer per polyamine at a lower relative stoichiometry of acylating agent per polyamine. Thus, a dispersant derived from a polybutene acylating agent with a functionality of 1.05 condensed with a 5-nitrogen polyethyleneamine in a ratio of 1.5 to 1 contains approximately the same ratio of non-polar to polar groupings as a dispersant made from a polybutene acylating agent with a functionality of 1.4 condensed with the same polyamine in a ratio of 2:1. The former composition would be considerably lower in viscosity and exhibit reduced interactions relative to the latter.

THE HYDROCARBYL DICARBOXYLIC ACID MATERIAL

The long chain hydrocarbyl substituted dicarboxylic acid material, i.e. acid or anhydride, or ester, used in the invention includes long chain hydrocarbon, generally a polyolefin, substituted with 1.05 to 1.25, preferably 1.06 to 1.20, e.g. 1.10 to 1.20 moles, per mole of polyolefin of an alpha or beta unsaturated $C_4$ to $C_{10}$ dicarboxylic acids, or anhydrides or esters thereof, such as fumaric acid, itaconic acid, maleic acid, maleic anhydride, chloromaleic acid, dimethyl fumarate, chloromaleic anhydride, etc.

Preferred olefin polymers for reaction with the unsaturated dicarboxylic acids are polymers comprising a major molar amount of $C_2$ to $C_{10}$, e.g. $C_2$ to $C_5$ monoolefin. Such olefins include ethylene, propylene, butylene, isobutylene, pentene, octene-1, styrene, etc. The polymers can be homopolymers such as polyisobutylene, as well as copolymers of two or more such olefins such as copolymers of: ethylene and propylene; butylene and isobutylene; propylene and isobutylene; etc. Other copolymers include those in which a minor molar amount of the copolymer monomers, e.g., 1 to 10 mole %, is a $C_4$ to $C_{18}$ non-conjugated diolefin, e.g., a copolymer of isobutylene and butadiene; or a copolymer of ethylene, propylene and 1,4-hexadiene; etc.

In some cases, the olefin polymer may be completely saturated, for example an ethylene-propylene copolymer made by a Ziegler-Natta synthesis using hydrogen as a moderator to control molecular weight.

The olefin polymers will usually have number average molecular weights within the range of about 1500 and about 5,000, more usually between about 1600 and about 3000. Particularly useful olefin polymers have number average molecular weights within the range of about 1500 and about 2500 with approximately one terminal double bond per polymer chain. An especially useful starting material for a highly potent dispersant additive made in accordance with this invention is polyisobutylene. The number average molecular weight for such polymers can be determined by several known techniques. A convenient method for such determination is by gel permeation chromatography (GPC) which additionally provides molecular weight distribution information, see W. W. Yau, J. J. Kirkland and D. D. Bly, "Modern Size Exclusion Liquid Chromatography", John Wiley and Sons, New York, 1979.

Processes for reacting the olefin polymer with the $C_{4-10}$ unsaturated dicarboxylic acid, anhydride or ester are known in the art. For example, the olefin polymer and the dicarboxylic acid material may be simply heated together as disclosed in U.S. Pat. Nos. 3,361,673 and 3,401,118 to cause a thermal "ene" reaction to take place. Or, the olefin polymer can be first halogenated, for example, chlorinated or brominated to about 1 to 8, preferably 3 to 7 wt. % chlorine, or bromine, based on the weight of polymer, by passing the chlorine or bromine through the polyolefin at a temperature of 100 to 250, e.g. 140 to 225° C. for about 0.5 to 10, preferably 1 to 7 hours. The halogenated polymer may then be reacted with sufficient unsaturated acid or anhydride at 100 to 250, usually about 140 to 180° C. for about 0.5 to 10, e.g. 3 to 8 hours, so the product obtained will contain about 1.05 to 1.25, preferably 1.06 to 1.20, e.g. 1.10 moles of the unsaturated acid per mole of the halogenated polymer. Processes of this general type are taught in U.S. Pat. Nos. 3,087,436; 3,172,892; 3,272,746 and others.

Alternatively, the olefin polymer, and the unsaturated acid material are mixed and heated while adding chlorine to the hot material. Processes of this type are disclosed in U.S. Pat. Nos. 3,215,707; 3,231,587; 3,912,764; 4,110,349; 4,234,435; and in U.K. 1,440,219.

By the use of halogen, about 65 to 95 wt. % of the polyolefin, e.g. polyisobutylene will normally react with the dicarboxylic acid material. Upon carrying out a thermal reaction without the use of halogen or a catalyst, then usually only about 50 to 75 wt. % of the polyisobutylene will react. Chlorination helps increase the reactivity. For convenience, the aforesaid functionality ratios of dicarboxylic acid producing units to polyolefin of 1.05 to 1.25; 1.06 to 1.20 and 1.10 to 1.20 are based upon the total amount of polyolefin, that is, the total of both the reacted and unreacted polyolefin, used to make the product.

NITROGEN AND ALCOHOL ASHLESS DISPERSANT DERIVATIVES

Useful amine compounds for neutralization of the hydrocarbyl substituted dicarboxylic acid material include mono- and polyamines of about 2 to 60, e.g. 3 to 20, total carbon atoms and about 1 to 12, e.g., 2 to 8 nitrogen atoms in the molecule. These amines may be hydrocarbyl amines or may be hydrocarbyl amines including other groups, e.g, hydroxy groups, alkoxy groups, amide groups, nitriles, imidazoline groups, and the like. Hydroxy amines with 1 to 6 hydroxy groups, preferably 1 to 3 hydroxy groups are particularly useful. Preferred amines are aliphatic saturated amines, including those of the general formulas:

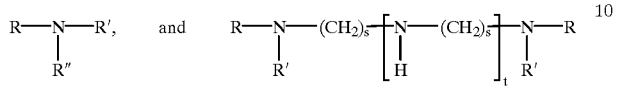

wherein R, R' and R" are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; each s can be the same or a different number of from 2 to 6, preferably 2 to 4; and t is a number of from 0 to 10, preferably 2 to 7.

Non-limiting examples of suitable amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene)triamine; di-(1,3-propylene) triamine; N,N-dimethyl-1,3-diaminopropane; N,N-di-(2-aminoethyl) ethylene diamine; N,N-di(2-hydroxyethyl)-1,3-propylene diamine; 3-dodecyloxypropylamine; N-dodecyl-1,3-propane diamine; tris hydroxymethylaminomethane (THAM); diisopropanol amine; diethanol amine; triethanol amine; mono-, di-, and tri-tallow amines; amino morpholines such as N-(3-aminopropyl)morpholine; etc.

Other useful amine compounds include: alicyclic diamines such as 1,4-di(aminomethyl) cyclohexane, and heterocyclic nitrogen compounds such as imidazolines, and N-aminoalkyl piperazines of the general formula:

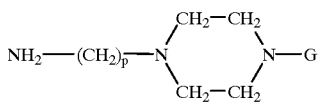

wherein G is independently selected from the group consisting of hydrogen and omega-aminoalkylene radicals of from 1 to 3 carbon atoms, and p is an integer of from 1 to 4. Non-limiting examples of such amines include 2-pentadecyl imidazoline; N-(2-aminoethyl) piperazine; etc.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and isomeric piperazines. Low cost poly(ethyleneamines) compounds averaging about 5 to 7 nitrogen atoms per molecule are available commercially under trade names such as "Polyamine H", "Polyamine 400", "Dow Polyamine E-100", etc.

Useful amines also include polyoxyalkylene polyamines such as those of the formulae:

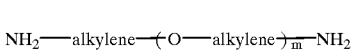

where m has a value of about 3 to 70 and preferably 10 to 35; and:

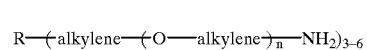

where n has a value of about 1 to 40 with the provision that the sum of all the n's is from about 3 to about 70 and preferably from about 6 to about 35 and R is a polyvalent saturated hydrocarbon radical of up to ten carbon atoms having a valence of 3 to 6. The alkylene groups in either formula (i) or (ii) may be straight or branched chains containing about 2 to 7, and preferably about 2 to 4 carbon atoms.

The polyoxyalkylene polyamines of formula (B) above, preferably polyoxyalkylene diamines and polyoxyalkylene triamines, may have average molecular weights ranging from about 200 to about 4000 and preferably from about 400 to about 2000. The preferred polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-403", etc.

The amine is readily reacted with the dicarboxylic acid material, e.g. alkenyl succinic anhydride, by heating an oil solution containing 5 to 95 wt. % of dicarboxylic acid material to about 100 to 250° C., preferably 125 to 175° C., generally for 1 to 10, e.g. 2 to 6 hours until the desired amount of water is removed. The heating is preferably carried out to favor formation of imides or mixtures of imides and amides, rather than amides and salts. Reaction ratios can vary considerably, depending upon the reactants, amounts of excess amine, type of bonds formed, etc. Generally from 0.3 to 2, preferably about 0.3 to 1.0, e.g. 0.4 to 0.8 mole of amine, e.g. bi-primary amine is used, per mole of the dicarboxylic acid moiety content e.g. grafted maleic anhydride content. For example, one mole of olefin reacted with sufficient maleic anhydride to add 1.10 mole of maleic anhydride groups per mole of olefin when converted to a mixture of amides and imides, about 0.55 moles of amine with two primary groups would preferably be used, i.e. 0.50 mole of amine per mole of dicarboxylic acid moiety.

The nitrogen containing dispersant can be further treated by boration as generally taught in U.S. Pat. Nos. 3,087,936 and 3,254,025 (incorporated herein by reference thereto). This is readily accomplished by treating said acyl nitrogen dispersant with a boron compound selected from the class consisting of boron oxide, boron halides, boron acids and esters of boron acids in an amount to provide from about 0.1 atomic proportion of boron for each mole of said acylated nitrogen composition to about 10 atomic proportions of boron for each atomic proportion of nitrogen of said acylated nitrogen composition. Usefully the dispersants of the inventive combination contain from about 0.05 to 2.0 wt. %, e.g. 0.05 to 0.7 wt. % boron based on the total weight of said borated acyl nitrogen compound. The boron, which appears to be in the product as dehydrated boric acid polymers (primarily $(HBO_2)_3$), is believed to attach to the dispersant imides and diimides as amine salts e.g. the metaborate salt of said diimide.

Treating is readily carried out by adding from about 0.05 to 4, e.g. 1 to 3 wt. % (based on the weight of said acyl nitrogen compound) of said boron compound, preferably boric acid which is most usually added as a slurry to said acyl nitrogen compound and heating with stirring at from about 135° C. to 190, e.g. 140–170° C., for from 1 to 5 hours followed by nitrogen stripping at said temperature ranges. Or, the boron treatment can be carried out by adding boric acid to the hot reaction mixture of the dicarboxylic acid material and amine while removing water.

The tris(hydroxymethyl) amino methane (THAM) can be reacted with the aforesaid acid material to form amides, imides or ester type additives as taught by U.K. 984,409, or to form oxazoline compounds and borated oxazoline compounds as described, for example, in U.S. Pat. Nos. 4,102, 798; 4,116,876 and 4,113,639.

The ashless dispersants may also be esters derived from the aforesaid long chain hydrocarbon substituted dicarboxylic acid material and from hydroxy compounds such as monohydric and polyhydric alcohols or aromatic compounds such as phenols and naphthols, etc. The polyhydric alcohols are the most preferred hydroxy compound and preferably contain from 2 to about 10 hydroxy radicals, for example, ethylene glycol, diethylene glycol, triethylene glycol, tetraethylene glycol, dipropylene glycol, and other alkylene glycols in which the alkylene radical contains from 2 to about 8 carbon atoms. Other useful polyhydric alcohols include glycerol, mono-oleate of glycerol, monostearate of glycerol, monomethyl ether of glycerol, pentaerythritol, dipentaerythritol, etc.

The ester dispersant may also be derived from unsaturated alcohols such as allyl alcohol, cinnamyl alcohol, propargyl alcohol, 1-cyclohexane-3-ol, and oleyl alcohol. Still other classes of the alcohols capable of yielding the esters of this invention comprise the ether-alcohols and amino-alcohols including, for example, the oxy-alkylene, oxy-arylene-, amino-alkylene-, and amino-arylene-substituted alcohols having one or more oxy-alkylene, amino-alkylene or amino-arylene oxy-arylene radicals. They are exemplified by Cellosolve, Carbitol, N,N,N',N'-tetrahydroxy-trimethylene di-amine, and ether-alcohols having up to about 150 oxy-alkylene radicals in which the alkylene radical contains from 1 to about 8 carbon atoms.

The ester dispersant may be di-esters of succinic acids or acidic esters, i.e., partially esterified succinic acids; as well as partially esterified polyhydric alcohols or phenols, i.e., esters having free alcohols or phenolic hydroxyl radicals. Mixtures of the above illustrated esters likewise are contemplated within the scope of this invention.

The ester dispersant may be prepared by one of several known methods as illustrated for example in U.S. Pat. No. 3,522,179.

Hydroxyamines which can be reacted with the aforesaid long chain hydrocarbon substituted dicarboxylic acid material to form dispersants include 2-amino-1-butanol, 2-amino-2-methyl-1-propanol, p-(beta-hydroxy-ethyl)-aniline, 2-amino-1-propanol, 3-amino-1-propanol, 2-amino-2-methyl-1, 3-propane-diol, 2-amino-2-ethyl-1, 3-propanediol, N-(beta-hydroxy-propyl)-N'-(beta-amino-ethyl)-piperazine, tris(hydroxymethyl) amino-methane (also known as trismethylolaminomethane), 2-amino-1-butanol, ethanolamine, beta-(beta-hydroxyethoxy)-ethylamine, and the like. Mixtures of these or similar amines can also be employed.

The preferred dispersants are those derived from polyisobutylene substituted with succinic anhydride groups and reacted with polyethylene amines, e.g. tetraethylene pentamine, pentaethylene hexamine, polyoxyethylene and polyoxypropylene amines, e.g. polyoxypropylene diamine, trismethylolaminomethane and pentaerythritol, and combinations thereof. One particularly preferred dispersant combination involves a combination of (A) polyisobutene substituted with succinic anhydride groups and reacted with (B) a hydroxy compound, e.g. pentaerythritol, (C) a polyoxyalkylene polyamine, e.g. polyoxypropylene diamine, and (D) a polyalkylene polyamine, e.g. polyethylene diamine and tetraethylene pentamine using about 0.3 to about 2 moles each of (B) and (D) and about 0.3 to about 2 moles of (C) per mole of (A) as described in U.S. Pat. No. 3,804,763. Another preferred dispersant combination involves the combination of (A) polyisobutenyl succinic anhydride with (B) a polyalkylene polyamine, e.g. tetraethylene pentamine, and (C) a polyhydric alcohol or polyhydroxy-substituted aliphatic primary amine, e.g. pentaerythritol or trismethylolaminomethane as described in U.S. Pat. No. 3,632,511.

THE METAL RUST INHIBITORS AND DETERGENTS

Metal containing rust inhibitors and/or detergents are frequently used with ashless dispersants. Such detergents and rust inhibitors include the metal salts of sulphonic acids, alkyl phenols, sulphurized alkyl phenols, alkyl salicylates, naphthenates, and other oil soluble mono- and di-carboxylic acids. Highly basic, that is overbased metal salts which are frequently used as detergents appear particularly prone to interaction with the ashless dispersant. Usually these metal containing rust inhibitors and detergents are used in lubricating oil in amounts of about 0.01 to 10, e.g. 0.1 to 5 wt. %, based on the weight of the total lubricating composition.

Highly basic alkaline earth metal sulfonates are frequently used as detergents. They are usually produced by heating a mixture comprising an oil-soluble sulfonate or alkaryl sulfonic acid, with an excess of alkaline earth metal compound above that required for complete neutralization of any sulfonic acid present and thereafter forming a dispersed carbonate complex by reacting the excess metal with carbon dioxide to provide the desired overbasing. The sulfonic acids are typically obtained by the sulfonation of alkyl substituted aromatic hydrocarbons such as those obtained from the fractionation of petroleum by distillation and/or extraction or by the alkylation of aromatic hydrocarbons as for example those obtained by alkylating benzene, toluene, xylene, naphthalene, diphenyl and the halogen derivatives such as chlorobenzene, chlorotoluene and chloronaphthalene. The alkylation may be carried out in the presence of a catalyst with alkylating agents having from about 3 to more than 30 carbon atoms such as for example haloparaffins, olefins that may be obtained by dehydrogenation of paraffins, polyolefins as for example polymers from ethylene, propylene, etc. The alkaryl sulfonates usually contain from about 9 to about 70 or more carbon atoms, preferably from about 16 to about 50 carbon atoms per alkyl substituted aromatic moiety.

The alkaline earth metal compounds which may be used in neutralizing these alkaryl sulfonic acids to provide the sulfonates includes the oxides and hydroxides, alkoxides, carbonates, carboxylate, sulfide, hydrosulfide, nitrate, borates and ethers of magnesium, calcium, and barium. Examples are calcium oxide, calcium hydroxide, magnesium acetate and magnesium borate. As noted, the alkaline earth metal compound is used in excess of that required to complete neutralization of the alkaryl sulfonic acids. Generally, the amount ranges from about 100 to 220%, although it is preferred to use at least 125%, of the stoichiometric amount of metal required for complete neutralization.

Various other preparations of basic alkaline earth metal alkaryl sulfonates are known, such as U.S. Pat. Nos. 3,150,088 and 3,150,089 wherein overbasing is accomplished by hydrolysis of an alkoxide-carbonate complex with the alkaryl sulfonate in a hydrocarbon solventdiluent oil.

A preferred alkaline earth sulfonate additive is magnesium alkyl aromatic sulfonate having a total base number ranging from about 300 to about 400 with the magnesium sulfonate content ranging from about 25 to about 32 wt. %, based upon the total weight of the additive system dispersed in mineral lubricating oil.

Neutral metal sulfonates are frequently used as rust inhibitors. Polyvalent metal alkyl salicylate and naphthenate materials are known additives for lubricating oil compositions to improve their high temperature performance and to counteract deposition of carbonaceous matter on pistons (U.S. Pat. No. 2,744,069). An increase in reserve basicity of the polyvalent metal alkyl salicylates and naphthenates can be realized by utilizing alkaline earth metal, e.g. calcium, salts of mixtures of $C_8$–$C_{26}$ alkyl salicylates and phenates (see U.S. Pat. No. 2,744,069) or polyvalent metal salts of alkyl salicyclic acids, said acids obtained from the alkylation of phenols followed by phenation, carboxylation and hydrolysis (U.S. Pat. No. 3,704,315) which could then be converted into highly basic salts by techniques generally known and used for such conversion. The reserve basicity of these metal-containing rust inhibitors is usefully at TBN levels of between about 60 and 150. Included with the useful polyvalent metal salicylate and naphthenate materials are the methylene and sulfur bridged materials which are readily derived from alkyl substituted salicylic or naphthenic acids or mixtures of either or both with alkyl substituted phenols. Basic sulfurized salicylates and a method for their preparation is shown in U.S. Pat. No. 3,595,791. Such materials include alkaline earth metal, particularly magnesium, calcium, strontium and barium salts of aromatic acids having the general formula:

HOOC—$ArR_1$—$Xy(ArR_1OH)_n$ where Ar is an aryl radical of 1 to 6 rings, $R_1$ is an alkyl group having from about 8 to 50 carbon atoms, preferably 12 to 30 carbon atoms (optimally about 12), X is a sulfur (—S—) or methylene (—$CH_2$—) bridge, y is a number from 0 to 4 and n is a number from 0 to 4.

Preparation of the overbased methylene bridged salicylate-phenate salt is readily carried out by conventional techniques such as by alkylation of a phenol followed by phenation, carboxylation, hydrolysis, methylene bridging a coupling agent such as an alkylene dihalide followed by salt formation concurrent with carbonation. An overbased calcium salt of a methylene bridged phenol-salicylic acid of the general formula:

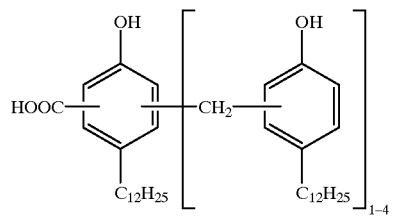

with a TBN of 60 to 150 is highly useful in this invention.

The sulfurized metal phenates can be considered the "metal salt of a phenol sulfide" which thus refers to a metal salt whether neutral or basic, of a compound typified by the general formula:

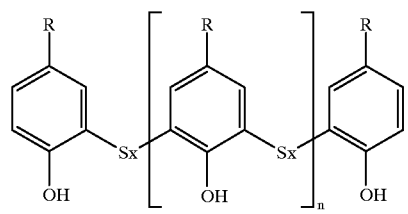

where x=1 or 2, n=0, 1 or 2
or a polymeric form of such a compound, where R is an alkyl radical, n and x are each integers from 1 to 4, and the average number of carbon atoms in all of the R groups is at least about 9 in order to ensure adequate solubility in oil. The individual R groups may each contain from 5 to 40, preferably 8 to 20, carbon atoms. The metal salt is prepared by reacting an alkyl phenol sulfide with a sufficient quantity of metal containing material to impart the desired alkalinity to the sulfurized metal phenate.

Regardless of the manner in which they are prepared, the sulfurized alkyl phenols which are useful generally contain from about 2 to about 14% by weight, preferably about 4 to about 12 wt. % sulfur based on the weight of sulfurized alkyl phenol.

The sulfurized alkyl phenol may be converted by reaction with a metal containing material including oxides, hydroxides and complexes in an amount sufficient to neutralize said phenol and, if desired, to overbase the product to a desired alkalinity by procedures well known in the art. Preferred is a process of neutralization utilizing a solution of metal in a glycol ether.

The neutral or normal sulfurized metal phenates are those in which the ratio of metal to phenol nucleus is about 1:2. The "overbased" or "basic" sulfurized metal phenates are sulfurized metal phenates wherein the ratio of metal to phenol is greater than that of stoichiometric, e.g. basic sulfurized metal dodecyl phenate has a metal content up to and greater than 100% in excess of the metal present in the corresponding normal sulfurized metal phenates wherein the excess metal is produced in oil-soluble or dispersible form (as by reaction with $CO_2$).

Another class of additive that can interact with ashless dispersants are the dihydrocarbyl dithiophosphate metal salts which are frequently used as antiwear agents and which also provide anti-oxidant activity. The zinc salts are most commonly used in lubricating oil in amounts of 0.1 to 10, preferably 0.2 to 2 wt. %, based upon the total weight of the lubricating oil composition. They may be prepared in accordance with known techniques by first forming a dithiophosphoric acid, usually by reaction of an alcohol or a phenol with $P_2S_5$ and then neutralizing the dithiophosphoric acid with a suitable zinc compound.

Mixtures of alcohols may be used including mixtures of primary and secondary alcohols, secondary generally for imparting improved antiwear properties, with primary giving improved thermal stability properties. Mixtures of the two are particularly useful. In general, any basic or neutral zinc compound could be used but the oxides, hydroxides and carbonates are most generally employed. Commercial additives frequently contain an excess of zinc due to use of an excess of the basic zinc compound in the neutralization reaction.

The zinc dihydrocarbyl dithiophosphates useful in the present invention are oil soluble salts of dihydrocarbyl esters of dithiophosphoric acids and may be represented by the following formula:

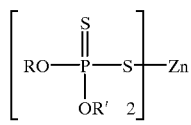

wherein R and R' may be the same or different hydrocarbyl radicals containing from 1 to 18, preferably 2 to 12 carbon atoms and including radicals such as alkyl, alkenyl, aryl, aralkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-octyl, decyl, dodecyl, octadecyl, 2-ethylhexyl, phenyl, butyl-phenyl, cyclohexyl, methylcyclopentyl, propenyl, butenyl etc. In order to obtain oil solubility, the total number of carbon atoms (i.e. R and R') in the dithiophosphoric acid will generally be about 5 or greater.

The Compositions

The dispersant products of this invention, that is the dicarboxylic acid producing material per se, or the product of said dicarboxylic acid producing material further reacted with amine, alcohol, amino alcohol, mixtures thereof, etc. can be incorporated in lubricating oil compositions, e.g. automotive crankcase lubricating oils, in concentrations within the range of about 0.01 to 15 weight percent, e.g. 0.1 to 10 weight percent, preferably 0.2 to 7.0 weight percent, based on the weight of the total compositions. The lubricants to which the products of this invention can be added include not only hydrocarbon oils derived from petroleum but also include synthetic oils such as alkyl esters of dicarboxylic acids, polyglycols and alcohols; polyalphaolefins, alkyl benzenes, organic esters of phosphoric acids, polysilicone oil, etc.

When the products of this invention are used as dispersants in normally liquid petroleum fuels such as gasoline, and middle distillates boiling from about 150° to 800° F., including kerosene, diesel fuels, home heating fuel oil, jet fuels, etc., a concentration of the additive in the fuel in the range of 0.001 to 0.5, preferably about 0.001 to 0.1 weight percent, based on the weight of the total composition, will usually be employed.

The additive may be conveniently dispensed as a concentrate comprising 5 to 70 wt. % of the dispersant, with 95 to 30 wt. % oil. More usually, a minor proportion of the additive, e.g. 5 to up to 50 wt. %., is dissolved in a major proportion of a mineral lubricating oil, e.g. 50%, to 95 wt. %, with or without other additives being present. The dispersant additive can also be used in lubricating oil additive packages, particularly those containing metal detergents. These packages will generally contain about 20 to 80 wt. % mineral lubricating oil and about 20 to 80, e.g. 40 to 60 wt. % dispersant additive. The package may further contain about 3 to 50, e.g. 3 to 40, preferably 5 to 25, e.g. 10 to 20 wt. % of the metal detergent. It may also contain about 3 to 40, preferably 5 to 25, e.g. 10 to 20 wt. % of zinc dithiophosphate. All of said weight percents of dispersant, metal detergent and zinc dithiophosphate additive being based upon the total weight of the additive package.

In the above compositions, concentrates or packages, other conventional additives may also be included, such as pour point depressants, antiwear agents such as tricresyl phosphate or zinc dithiophophates, antioxidants such as N-phenyl α-naphthylamine, t.-octyl phenol sulfide, 4,4'-methylene bis(2,6-di-tertbutyl phenol), viscosity index improvers such as ethylene-propylene copolymers, polymethacrylates, polyisobutylene, alkyl fumarate-vinyl acetate copolymers and the like, as well as other ashless dispersants such as other polyisobutylene succinic anhydrides reacted with amines, hydroxy amines, polyols, etc.

This invention will be further understood by reference to the following examples, wherein all parts are parts by weight, unless otherwise noted and which include preferred embodiments of the invention.

EXAMPLE 1

Part A

A polyisobutenyl succinic anhydride (PIBSA) having a SA:PIB ratio of 1.04 succinic anhydride (SA) moieties per polyisobutylene (PIB) molecule of 1725 $\overline{M}_n$ was prepared by heating a mixture of 100 parts of polyisobutylene with 7.55 parts of maleic anhydride to a temperature of about 220° C. When the temperature reached 120° C., the chlorine addition was begun and 5.88 parts of chlorine at a constant rate was added to the hot mixture for about 5.5 hours. The reaction mixture was then heat soaked at 220° C. for about 1.5 hours and then stripped with nitrogen for about one hour. The resulting polyiso-butenyl succinic anhydride had an ASTM Saponification Number of 64.2 which calculates to a succinic anhydride (SA) to polyisobutylene (PIB) ratio of 1.04 based upon starting PIB as follows:

$$\text{SA:PIB ratio} = \frac{1725 \times 64.2}{(112200 - 64.2 \times 96)} = 1.04$$

The PIBSA product was 83.8 wt. % active ingredient (a.i.), the remainder being primarily unreacted PIB. The SA:PIB ratio of 1.04 is based upon the total PIB charged to the reactor as starting material, i.e. both the PIB which reacts and the PIB which remains unreacted.

Part B

The PIBSA of Part A was aminated and borated as follows:

1800 g of the PIBSA having a Sap. No. of 64.2 and 1317 g of S150N lubricating oil (solvent neutral oil having a viscosity of about 150SUS at 100° C.) was mixed in a reaction flask and heated to about 149° C. Then 121.9 g of a commercial grade of polyethyleneamine (hereinafter referred to as PAM) which was a mixture of polyethyleneamines averaging about 5 to 7 nitrogens per molecule was added and the mixture heated to 149° C. for about one hour, followed by nitrogen stripping for about 1.5 hours. Next, 49 g of boric acid was added over about two hours while stirring and heating at 163° C., followed by two hours of nitrogen stripping, then cooling and filtering to give the final product. This product had a viscosity of 428 cs. at 100° C., a nitrogen content of 1.21 wt. %, a boron content of 0.23 wt. % and contained 49.3 wt. % of the reaction product, i.e. the material actually reacted, and 50.7 wt. % of unreacted PIB and mineral oil (S150N).

EXAMPLE 2

A PIBSA having a SA:PIB ratio of 1.26 was prepared in a similar manner to Example 1, Part A, except that 100 parts of polyisobutylene was reacted with 7.40 parts of chlorine and 10.23 parts of maleic anhydride. The PIBSA had a Sap. No. of 76.7 and was 87.3 wt. % active.

1800 g of the PIBSA (Sap. No. 76.7) was mixed with about 1462 g S150N oil and 145.7 g PAM followed by heating to 149° C. for 1 hour, nitrogen stripping for 1.5 hours, then adding 51.5 g boric acid and heating for 2 hours at 163° C. followed by 2 more hours of nitrogen stripping, then cooling and filtering.

The final product contained 1.41 wt. % N; 0.23 wt. % B, and contained 52.8 wt. % of the reaction product, with a viscosity of 458 cs. at 100° C.

EXAMPLE 3

PIBSA having a SA:PIB ratio of 1.41 was prepared in the general manner of Example 1, Part A except that 11.63 parts of maleic anhydride was mixed with 100 parts of polyisobutylene of 1725 $\overline{M}_n$ and blown with 8.42 parts of chlorine over 4.5 hours. The PIBSA had a Sap. No. of 84.8 and was about 90.3 wt. % a.i. with 9.7 wt. % unreacted PIB.

1800 g of the PIBSA (SA:PIB ratio of 1.41) was diluted with 1536 g of S150N oil, and reacted with 161.1 g of the aforesaid PAM for 1 hour at 149° C., and nitrogen stripped for 1.5 hours. Then 52.8 g of boric acid was added over 2 hours while stirring at 163° C. followed by nitrogen stripping for 2 hours, cooling and then filtering.

The product contained 1.49 wt. % N; 0.22 wt. % B; had a viscosity of 574 cs. at 100° C. and contained 52.8 wt. % of the reaction product.

EXAMPLE 4

A PIBSA having a SA:PIB ratio of 1.13 was prepared by reacting 100 parts of polyisobutylene (1725 $\overline{M}_n$) with 8.12 parts of maleic anhydride by the addition of 6.29 parts of chlorine over 5.5 hours as in Example 1, Part A. The PIBSA had a Sap. No. of 69.3 and contained 85.2 wt. % a.i.

In a manner similar to that of Example 3, 1600 parts of the PIBSA (SA:PIB ratio of 1.13, 85.2 wt. % a.i.) was diluted with 1350 parts of S150N oil and reacted with 118 parts of PAM for 1 hour at 149° C. and nitrogen stripped for 1.5 hours. Then 39.2 parts of boric acid was added over 1.5 hours while stirring at 163° C. followed by nitrogen stripping for 2 hours, cooling and then filtering. The final product contained 1.24 wt. % N; 0.25 wt. % B, and had a viscosity of 463 cs. at 100° C. and contained 49.1 wt. %. of the reaction product.

EXAMPLE 5

PIBSA having a SA:PIB ratio of 0.97 was prepared in the general manner of Example 1, Part A but reacting 6.98 parts of maleic anhydride with 100 parts of polyisobutylene (1725 mol. wt.) by adding 5.47 parts of chlorine over 5.5 hours. The resulting PIBSA had a Sap. No. of 59.6, and was 79.7 wt. % active.

1800 g of the PIBSA was mixed with 1162 g of S150N oil, and reacted with 113.2 g of PAM at 149° C. for 1 hour and then nitrogen stripped for 1.5 hours. This was followed by the addition of 46 g of boric acid over 2 hours at 163° C. followed by 2 hours of stripping while at 163° C. The final product after filtering contained 1.20 wt. % N; 0.24 wt.1 8, and had a viscosity of 475 cs. at 100° C. and contained 55.6 wt. % of the reaction product.

Additive Interaction Test

The products of Examples 1 to 5 were tested for additive interaction effects by blending 50 g of said products with a 12.5 g of metal detergent additive and 12.5 g of S150N and measuring the viscosity initially and after 24 and 168 hours at 100° C.

Two metal detergents were used in the above tests. Detergent A was a 400 TBN (Total Base Number) overbased magnesium sulfonate of about 9 wt. % magnesium lubricating oil additive. Detergent B was a 300 TBN overbased calcium sulfonate of about 12 wt. % calcium, lubricating oil additive. The ratio of 4:1:1 for the dispersant:detergent:oil ratio was used so as to give interaction that would not result in gel, but which were large enough to differentiate between strongly and weakly interacting systems. Also many lubricating formulations have 3 or 4 fold excess of dispersant over detergent.

Table 1, which follows, summarizes the compositions tested and the test results.

TABLE

Additive Interaction Test
Viscosity, cs. at 100° C.

| Dispersant | SA:PIB | Detergent | Theoretical* | Initial | 24 hr. | 28 hr. | 168 hrs. |
|---|---|---|---|---|---|---|---|
| Example 1 | 1.04 | A | 132 | 203 | 209 | — | 246 |
| " |  | B | 123 | 185 | 190 | — | 242 |
| " |  | B | 123 | 187 | — | 198 | 244 |
| Example 2 | 1.26 | A | 137 | 250 | 265 | — | 327 |
| " |  | B | 129 | 240 | 247 | — | 322 |
| " |  | B | 129 | 243 | — | 266 | 316 |
| Example 3 | 1.41 | A | 160 | 380 | 413 | — | 547 |
| " |  | B | 151 | 422 | 454 | — | 560 |
| " |  | B | 151 | 433 | — | 464 | 565 |
| Example 4 | 1.13 | A | 138 | 224 | 230 | — | 210 |
| " |  | B | 131 | 211 | 212 | — | 264 |
| Example 5 | 0.97 | A | 141 | 211 | 221 | — | 281 |
| " |  | B | 133 | 188 | 203 | — | 237 |
| " |  | B | 133 | 189 | 194 | — | 242 |

*Expected based on blending curves, i.e. based upon the sum of the viscosity effects of each additive component individually in oil without interaction with other additives.

The data in Table I shows that the interaction between the dispersant and metal detergent increases as the SA:PIB ratio goes from a 0.97 SA:PIB ratio up to a ratio of 1.41. The interaction, as measured by viscosity increase, accelerates as one moves to the 1.41 ratio. The invention is represented by Example 4 in Table I, which at 1.13 SA:PIB ratio is within the claimed ranges of the invention, i.e. 1.05 to 1.25, and which gave low interaction between the dispersant and metal detergent.

EXAMPLE 6

A polyisobutenyl succinic anhydride having a SA:PIB ratio of 1.09 is prepared from polyisobutylene having a number average molecular weight of about 2250. The PIBSA is prepared in a manner similar to that of Example 1, Part A except that 100 parts by weight of polyisobutylene are reacted with about 5.67 parts of chlorine and about 6.97 parts of maleic anhydride.

The resulting polyisobutenyl succinic anhydride will have a Sap. No. of about 52.

1800 parts of the PIBSA are mixed with 1163 parts of S150N and 94 parts of PAM. The mixture is heated to 149° C. for 1 hour and nitrogen stripped at this temperature for 1.5 hours. 36.5 parts of boric acid are added over 1.5 hours while stirring at 163° C. followed by nitrogen stripping for 2 hours, cooling and filtering.

The product will contain about 0.97 wt. % N and about 0.28 wt. % B.

EXAMPLE 7

A polyisobutenyl succinic anhydride having a SA:PIB ratio of about 1.15 is prepared from polyisobutylene having a number average molecular weight of about 1950. The PIBSA is prepared in a manner similar to that of Example 1, Part A except that about 6.53 parts of chlorine and about 8.02 parts of maleic anhydride are used.

The resulting polyisobutenyl succinic anhydride will have a Sap. No. of about 62.5 and will be about 84.4 wt. % active.

1800 parts of the PIBSA are mixed with 1328 parts of S150N and 104 parts PAM, heated to 149° C. for 1 hour, stripped by nitrogen blowing for 1.5 hours. Then 38 parts of boric acid are added over 1.5 hours while mixing at a temperature of 163° C. This is followed by 2 hours of nitrogen stripping, cooling and filtering. The final product will contain about 1.08 wt. % N and 0.26 wt. % B.

EXAMPLE 8

A polyisobutenyl succinic anhydride (PIBSA) having a SA:PIB ratio of about 1.15 is prepared from polyisobutylene having a number average molecular weight of about 2600. The PIBSA is prepared in a manner similar to that of Example 1, Part A, except that 4.9 parts of chlorine and 6 parts of maleic anhydride is used.

The resulting polyisobutenyl succinic anhydride will have a Sap. No. of about 43.6 and will be about 73 wt. % active.

1800 parts of the PIBSA is mixed with 992.4 parts of S150N and 83.3 parts PAM, heated to 149° C. for 1 hour, stripped by nitrogen blowing for 1.5 hours. 56 parts of boric acid is then added over 1.5 hours while mixing at a temperature of 163°. This is followed by 2 hours of nitrogen stripping, cooling and filtering. The final product will contain about 0.96 wt. % N and about 0.33 wt. % B.

EXAMPLE 9

A polyisobutenyl succinic anhydride having a SA:PIB ratio of 1.25 is prepared from polyisobutylene having a number average molecular weight of about 2600. The PIBSA is prepared in a manner similar to that of Example 1, Part A, except that 6.00 parts of chlorine and 7.54 parts of maleic anhydride are used.

The resulting polyisobutenyl succinic anhydride will have a Sap. No. of about 51.6 and is about 80 wt. % active.

1800 parts of the PIBSA is mixed with 1328 parts of S150N and 100.9 parts PAM, heated to 149° C. for 1 hour, stripped by nitrogen blowing for 1.5 hours. 60 parts of boric acid is then added over 1.5 hours while mixing at a temperature of 163° C. This is followed by 2 hours of nitrogen stripping, cooling and filtering. The final product will contain about 1.07 wt. % N and about 0.32 wt. % B.

EXAMPLE 10

A polyisobutenyl succinic anhydride is prepared from polyisobutylene of about 2200 molecular weight to have a SA:PIB ratio of about 1.13, followed by reaction with PAM and boric acid to give a lubricating oil dispersant with about 0.25 wt. % boron and about 1.0 wt. % nitrogen.

Engine Tests

EXAMPLE 11

Lubricant A was a 10W40 crankcase motor oil and was formulated containing 4.5 vol. % of a dispersant concentrate of a non-borated dispersant product made by reacting PAM with a PIBSA wherein the PIB had a molecular weight of about 1740 and the SA:PIB ratio or functionality was 1.19. The PIBSA was made by chlorinating the PIB and then reacting with maleic anhydride. This concentrate analyzed about 1.27 wt. % N. The formulation also contained a hydrocarbon type viscosity index improver, a zinc dialkyl dithiophosphate, an overbased 400TBN magnesium sulfonate, an anti-friction additive and anti-foamant.

Lubricant B was similar to Lubricant A but used 4.5 vol. % of a concentrate of an ashless dispersant made from a PIBSA having a SA:PIB ratio of about 1.3 to 1 using a 1300 mol. wt. PIB. This PIBSA was reacted with PAM. The concentrate of this dispersant analyzed about 1.46 wt. % N.

Lubricants A and B were tested in a MS sequence VD Engine Test. This test is well known in the automotive industry. It is described in ASTM Document for Multigrade Test Sequence for Evaluating Automotive Engine Oil, Sequence VD, Part 3 of STP 315H. At the end of each test, various parts of the engine are rated on a merit basis of 0 to 10, wherein 10 represents a perfectly clean part while the lesser numbers represent increasing degrees of deposit formation. The various ratings are then totaled and averaged on a basis of 10 as a perfect rating. The test is carried out in a 1980 Model Ford 2.3L 4-cylinder engine under test conditions which simulate "stop and go" city driving and moderate temperature operations. Cleanliness results obtained with the compositions described above are given in Table II.

TABLE II

MS SEQUENCE VD TEST RESULTS
Merit Ratings (Basis 0 to 10)

| 10W40 Lubricants | | | |
|---|---|---|---|
| | A | B | Requirements |
| Sludge | 9.54 | 9.50 | 9.4 |
| Varnish, ave. | 6.68 | 6.35 | 6.6 |
| Piston Skirt Varnish | 6.78 | 6.77 | 6.7 |
| Dispersant conc. vol. % | 4.5 | 4.5 | |

Table II shows that 4.5 vol. % of the dispersant used in Lubricant B was insufficient to pass the test as it did not meet the 6.6 requirement for average varnish. On the other hand, 4.5 vol. % of the dispersant concentrate of the invention met all the requirements of this test, even though it had a lower nitrogen concentration.

Improvements in performance are also obtained by the invention when comparing borated dispersants. Thus, Lubricant A' was prepared similar to Lubricant A except that 4.5 vol. % of a borated dispersant concentrate was used wherein the PIB had a molecular weight of 1687, the SA:PIB ratio was 1.18, and the dispersant analyzed 1.21 wt. % nitrogen and 0.28 wt. % boron. Lubricant A' gave a sludge rating of 9.54, an average varnish of 6.98 and a piston skirt varnish rating of 7.14. Lubricant B' was prepared similar to Lubricant B except that 4.5 vol. % of a borated dispersant concentrate was used wherein the PIB had a molecular weight of 1300, the SA:PIB ratio was 1.31 and the dispersant analyzed 1.46 wt. % nitrogen and 0.32 wt. % boron. Lubricant B', as an average of several tests in the same engine used for testing Lubricant A', gave a sludge rating of 9.55, average varnish of 6.63 and piston skirt varnish of 7.06. Using a different engine, Lubricant B' (ave. of several tests) gave a sludge rating of 9.50, average varnish of 6.44 and piston skirt varnish of 6.93. Thus, a better average varnish was obtained by Lubricant A' which contained dispersant of the invention.

Lubricant C was similar to Lubricant A except that it was a 10W30 crankcase oil containing 4.0 vol. % of the dispersant concentrate. Lubricant C also required a lesser amount of the viscosity index improver due to its 10W30 viscosity requirements.

Lubricant D was similar to Lubricant C except that it contained 4.0 vol. % of the dispersant concentrate used in Lubricant B.

Lubricants C and D were tested in a Caterpillar 1-H2 Test, but for 120 hours rather than the full 480 hour test described in ASTM Document for Single Cylinder Engine Test for Evaluating the Performance of Crankcase Lubricants, Caterpillar 1-H2 Test Method, Part 1, STP 509A. This test evaluates the ability of diesel lubricants to curtail accumulation of deposits on the piston when operating in high severity diesel engines.

The results are shown in Table III.

TABLE III

| Caterpillar 1-H2 Test - 120 Hours | | |
|---|---|---|
| | 10W30 Lubricants | |
| | C | D |
| WTD | 48 | 154 |
| TGF | 11 | 25 |

Table III shows that the dispersant of the invention used in Lubricant A was superior in (TGF) top groove fill and (WTD) weighed total demerits, i.e. deposits, compared with the known dispersant of Lubricant A. This favorable comparison was obtained even though the total nitrogen content was only 1.27 nitrogen for Lubricant A as compared to 1.46 wt. % nitrogen for the known dispersant concentrate, thus demonstrating a more efficient utilization of the higher cost polyamine component of the dispersant.

A Caterpillar 1G-2 Test was carried out, except the test was for 120 hours rather than the full 480 hour test described in ASTM Document for Single Cylinder Engine Test for Evaluating the Performance of Crankcase Lubricants, Caterpillar 1-G2 Test Method, Part 1, STP 509A, on Lubricant C', prepared similarly to Lubricant C except that 4.0 wt. % of the borated dispersant concentrate product of Example 4 was used. Lubricant D' was also tested and was prepared similarly to Lubricant D except that the borated dispersant concentrate was of 1300 mol. wt. PBS, with a PIBSA with a SA:PIB ratio of 1.31 and the dispersant analyzed 1.46 wt. % N and 0.32 wt. % B. Lubricant C' shows a TGF (top groove fill) of 54, and a WTD (weighed total demerits) of 339, which was about comparable to that of Lubricant D' which gave a TGF of 57 and a WTD of 324.

Tables II and III show the effectiveness of the dispersant in both gasoline and diesel engine tests and demonstrate the high engine performance that can be attained by the higher molecular weight polymer combined with a sufficiently high SA:PIB ratio to form an improved dispersant. Table I shows that too high an SA:PIB ratio can cause undesired viscosity increase and additive interactions. Thus, the present invention obtains an unexpected overall improvement in properties within the select ranges of the invention.

What is claimed is:

1. A fuel composition comprising (i) a liquid petroleum fuel and (ii) an oil soluble dispersant comprising an oil soluble reaction product of a reaction mixture comprising:

(a) a hydrocarbyl substituted $C_4$ to $C_{10}$ dicarboxylic acid producing material formed by reacting olefin polymer of $C_2$ to $C_{10}$ monoolefin having a number average molecular weight of about 1500 to 5,000 and a $C_4$ to $C_{10}$ monounsaturated acid material, wherein the substituted material has a functionality ratio of from about 1.05 to 1.25 dicarboxylic acid producing moieties per molecule of said olefin polymer used in the reaction; and (b) a basic reactant selected from the group consisting of polyamine, polyhydric alcohol, amino alcohol and mixtures thereof.

2. The fuel composition according to claim 1, wherein (ii) (b) is a polyamine.

3. The fuel composition according to claim 2, wherein said dispersant is borated, wherein (ii) (b) is a polyethyleneamine and said reaction mixture includes boric acid.

4. The fuel composition according to claim 1, wherein (ii) (b) is a polyhydric alcohol.

5. The fuel composition according to claim 1, wherein (ii) (b) is an amino alcohol.

6. The fuel composition according to claim 1, wherein the liquid petroleum fuel is selected from the group consisting of gasoline, kerosene, diesel fuel, home heating fuel oil, and jet fuel.

7. The fuel composition according to claim 6, wherein the dispersant has a concentration in the range of 0.001 to 0.5 weight percent, based on the weight of the composition.

8. The fuel composition according to claim 1, wherein the monounsaturated acid material is maleic anhydride.

9. The fuel composition according to claim 8, wherein the olefin polymer comprises a member selected from the group consisting of polyisobutylene and copolymer of butylene and isobutylene.

10. The fuel composition according to claim 9, wherein the number average molecular weight of the olefin polymer is from about 1500 to 3,000.

11. The fuel composition according to claim 10, wherein the basic reactant (ii) (b) comprises polyamine.

12. The fuel composition according to claim 11, wherein the basic reactant (ii) (b) comprises polyethyleneamine.

13. The fuel composition according to claim 2, wherein the dispersant is further treated with a boron compound selected from the group consisting of boron oxide, boron halides, boron acids and esters of boron acids to obtain a borated dispersant.

14. The fuel composition according to claim 13, wherein the basic reactant (ii) (b) comprises polyethyleneamine.

15. The fuel composition according to claim 2, wherein the number average molecular weight of the olefin polymer is from about 1500 to 3,000.

16. The fuel composition according to claim 15, wherein the substituted material has a functionality ratio of from about 1.06 to 1.20.

17. The fuel composition according to claim 16, wherein the number average molecular weight of the olefin polymer is from about 1500 to 2,500.

18. The fuel composition according to claim 17, wherein the monounsaturated acid material is maleic anhydride.

19. The fuel composition according to claim 18, wherein the olefin polymer comprises a member selected from the group consisting of polyisobutylene and copolymer of butylene and isobutylene.

* * * * *